Aug. 12, 1947.   H. P. LUNDGREN   2,425,550
PROCESS OF MAKING ORIENTED REGENERATED PROTEIN PRODUCTS
Filed April 17, 1943
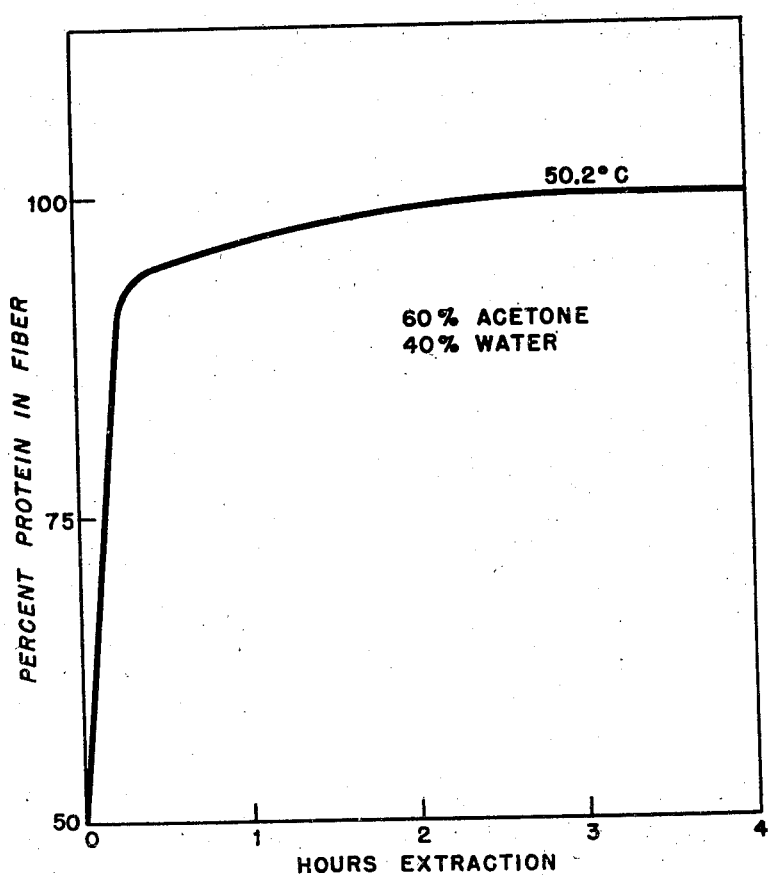
INVENTOR
H P LUNDGREN
BY
C. J. Kramer
ATTORNEY Patented Aug. 12, 1947

2,425,550

UNITED STATES PATENT OFFICE 2,425,550

PROCESS OF MAKING ORIENTED REGENERATED PROTEIN PRODUCTS

Harold P. Lundgren, Berkeley, Calif., assignor to the United States of America, as represented by the Secretary of Agriculture Application April 17, 1943, Serial No. 483,496

5 Claims. (Cl. 18—54)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

The object of this invention is the formation of protein-colloidal-detergent complexes from any known type of protein and the further formation of fibrous regenerated protein from such protein-colloidal detergent complexes. A further object of this invention is the production of fibrous regenerated protein in the oriented form as in fibers and films.

Other objects and advantages of this invention will be apparent from the following description.

This application is in part a continuation of my application for patent filed July 15, 1942, Serial No. 451,091.

The use of mixtures of proteins and detergents is not new. Detergents have been described extensively as dispersing agents for proteins and oils in mixtures having application as adhesives, sizes, finishes, paints and the like. Detergents have also been suggested as plasticizers for proteins used as plastics or films. It has also been shown that detergents are not only good dispersing agents for proteins but also that they denature them. However, no attempts have been made heretofore to determine the exact nature of the mixture, especially with reference to the possibility of formation of a protein-detergent complex. I have found that actual chemical combinations between detergents and proteins occur. These combinations and the changes in structure of the proteins involved have been investigated by such means as electrophoresis, diffusion measurements, X-ray diffraction patterns, viscosity measurements, dilatometry, and chemical analysis, as described below.

Denaturation of corpuscular (non-fibrous) proteins in solution is known to be brought about by various means among which are heat, pressure, urea and other chemical denaturants. Earlier studies of the denaturation of corpuscular proteins have shown that this reaction proceeds in two or more stages. For example, in 1935, Astbury et al. (Biochem. J. 29, 2351 (1935)) suggested from X-ray diffraction studies that seed globulins appear to pass through an intermediate fibrous state before reaching complete denaturation. Astbury and associates prepared from urea-denatured corpuscular proteins, elastic threads which on extension gave X-ray diffraction patterns analogous to those shown by stretched animal hairs, and so forth. (Astbury & Chibnall Fr. 812,474; Chibnall et al., Br. 467,812; Chibnall et al., Br. 467,704.) In previous work (see Nature 143, 899, 1939; J. Phys. Chem. 43, 989, 1939) I have shown that in the salt-free condition several corpuscular proteins underwent changes giving rise to unfolded configurations distinguishable as separate sedimentation boundaries in the ultracentrifuge. I have also found that the unfolded or fibrous configurations were fixed in the presence of urea and acetic acid. After complete, as opposed to partial denaturation, the proteins sedimented at rates indistinguishable from those of the corpuscular form indicating a recoiling to a shape not significantly different from the original.

Viscosity measurements have been employed for the determination of shapes of protein molecules. Neurath (J. Biol. Chem. 142, 249–269, 1942) used such determinations for measuring the change of shape of corpuscular proteins in urea dispersions. His conclusions confirmed the conclusions drawn from the sedimentation experiments.

My work on protein-colloidal detergent systems differs from all of the previous work, in that I have shown that proteins and detergents under appropriate conditions interact to form complexes having distinct chemical compositions, greater viscosities than the unmixed solutions and different electrical charges. I have characterized protein-colloidal-detergent complexes which either can be extruded into a precipitation bath in the form of fibers or films or precipitated first and then pulled, drawn or extruded into fibers or stretched into films. In the following descriptions, as typical of the corpuscular proteins, I have chosen as an example, egg albumin and as typical of fibrous proteins, I have chosen chicken feather kerateine, but these proteins have been used for purposes of illustration only and are not intended to limit the scope of this invention. As typical of the colloidal detergents, I have chosen the commercially available, salt-free, sodium alkyl benzene sulphonate wherein the alkyl group is between $C_{12}$ and $C_{18}$. Other colloidal-detergents have been employed with equal success.

By colloidal-detergents, I refer to those compounds in which a large non-polar group is attached to a polar group and which, under the conditions used in this invention, exist in solution in the colloidal state. Various types of compounds have been used, but, in general, the alkaline salts of alkyl aryl- and alkyl naphthylsulphonates are most efficient. As examples of alkyl aryl sulphonates, I have used the commercial sodium alkyl benzene sulphonate, wherein the alkyl group is between $C_{12}$ and $C_{18}$; sodium decyl benzene sulphonate, sodium dodecyl benzene sulphonate; and alkylated monosodium benzene sulphonate wherein the several alkyl groups total 10 carbon atoms. As examples of alkyl naphthyl sulphonates, I have used sodium isopropyl naphthalene sulphonate and sodium alkyl naphthalene sulphonates. Other colloidal-detergents, such as, for example, sulphonated castor oil, have been used successfully. The specific colloidal-detergents mentioned above, however, are not intended to limit the scope of this invention.

Chemical analyses of precipitates obtained as hereinafter described, from mixtures of colloidal-detergents and native egg albumin or denatured egg albumin or feather keratine show that these proteins definitely unite with the detergent in a characteristic fashion. Graphic analysis indicates that the process for the albumins is more complicated than that for the feather keratine conforming that transformation from corpuscular to fibrous configuration takes place under these conditions. On the other hand, feather keratine from the naturally-existing fibrous protein, combines readily with the detergent in all ratios, indicating that no structural transformation occurs.

Native corpuscular protein→Unfolded protein→Denatured protein
↓
Fibrous protein→Fibrous protein-colloidal detergent complex Viscosity changes, observable in the egg albumin sodium alkyl benzene sulphonate (alkyl $C_{12}$ to $C_{18}$) systems and not found in the feather keratine detergent solutions, confirm the results of the chemical analyses. Furthermore, the results of electrophoretic analyses are also in agreement. In this case, the existence of protein-detergent complexes is shown by the presence of new boundaries with characteristic mobilities.

Flow birefringence measurements show that protein-detergent complexes are asymmetric micelles and diffusion measurements confirm that they are highly polydisperse, having molecular weight higher than either the original protein or detergent alone.

The protein can be regenerated in the fibrous form from the fibrous protein-colloidal detergent complex by treatment with an excess of an appropriate solvent, such as, for example, 60 percent aqueous acetone. The solvent breaks the weak secondary valence bonds of the complex, removes the detergent and leaves the protein in the form of microscopic fibrils. The detergent breaks the bonds which hold the chains of the protein in a folded (corpuscular) position and attaches itself along the chains at the points where the bonds have broken and thereby keeps the chains unfolded. A true chemical complex is thereby obtained unlike physical mixtures. By removing the detergent from this chemical complex, after precipitation into fibers or films, the protein is regenerated to its original chemical structure, but new physical structure.

The different investigational methods have thus independently shown that under controlled conditions it is possible in the presence of colloidal-detergent to unfold corpuscular proteins and render permanent, the fibrous configuration. Feather keratine from the naturally existing fibrous feather keratin, being already in the fibrous state, does not undergo structural transformation prior to the fixation.

Fibers of films prepared from protein detergent complexes become brittle when dry and cannot withstand drawing to the point where X-ray patterns show molecular orientation. In hot water or steam, the protein detergent fibers are weak due to the strong free hydrophilic groups contributed by the detergent.

After regeneration in an appropriate solvent, such as, for example, 60 percent aqueous acetone, the protein is in a form capable of being drawn to give fibers having high tensile strength, pliability and a high order of molecular orientation as shown by X-ray patterns and by birefringence measurements. In the accompanying drawing, there is shown a typical regeneration curve for a fiber prepared from egg albumin and sodium alkyl benzene sulphonate. The original fiber consisted of roughly equal parts of the protein and detergent. The solvent used was 60 percent aqueous acetone and the temperature was 50.2° C.

Steam or hot water is used to orient the unfolded units of the regenerated fibers to give a permanent true fiber. After drawing the regenerated protein fiber 300 to 500 percent, the fiber becomes strong, pliable, optically birefringent and shows sharp X-ray patterns characteristic of beta keratin patterns of silk or stretched wool. The highly drawn protein fibers are resistant to swelling in water.

It is to be understood that this invention is not limited to the use of 60 percent acetone for regeneration or to the use of hot water or steam environments for drawing of the regenerated fibrous protein. Alcohols, substituted glycols, and other organic solvents can be used for regeneration either alone or in mixtures and with water. Similarly, organic vapors may be substituted for water for drawing.

My invention differs from all other applications made on mixtures of proteins and colloidal detergents in both the manner of controlling the production of specific protein-colloidal-detergent complexes and the production of regenerated fibrous protein therefrom. The detergent has been used as a means for structural transformation in the case of globular proteins and for micelle lubrication during the formation of the fibers by extrusion or pulling.

After the protein is regenerated in the fibrous form, it is capable of being drawn and oriented into strong true fibers which was not true of the original native protein. The oriented fibers show high tensile strength, high water resistance, and pliability.

The following examples will illustrate procedures suitable for the production of films and regenerated fibers from protein-colloidal detergent solutions, but are not intended to limit the scope or objectives of this invention.

*Example 1.*—To one part of egg white powder dissolved in 4.4 parts of water is added 1 part of sodium alkyl aryl sulphonate dissolved in 3.9 parts of water. The mixture after standing at least 24 hours is extruded into saturated $MgSO_4$. The resulting fiber is drawn 100 percent, washed, and partially dried. The protein is regenerated by treatment for 24 hours at room temperature in 60 percent aqueous acetone. The regenerated fiber is drawn in steam 300 to 500 percent to give a highly oriented fiber.

*Example 2.*—To 2 parts of 6–7 percent solution of chicken feather kerateine (or wool, horn or hoof kerateine) in 0.2 M $Na_2S$ is added 1½ parts sodium alkyl aryl sulphonate in 5 percent aqueous solution. Add 1 part of saturated $MgSO_4$ or $NH_4SO_4$ or $Na_2SO_4$. The precipitate is then collected, kneaded, and rolled to form rods which are immediately pulled into fibers each rod producing one fiber. After washing in water, the fibers are partially dried and the protein is regenerated by treatment with aqueous acetone or alcohol and drawn according to the procedure described in Example 1.

*Example 3.*—One part of ground oil extracted soybean meal is extracted at 90° centigrade for 2 minutes with 10 parts of 3 percent sodium alkyl aryl sulphonate. The filtered extract is cooled and precipitated with saturated magnesium sulfate. The precipitate is collected, rolled and pulled into fibers as in Example 2. These are partially dried and extracted with 60 percent acetone and drawn in steam to give true fibers.

*Example 4.*—Three parts of pulverized egg white and 3 parts of sodium isopropyl naphthalene sulphonate are dissolved in 100 parts water. Ten parts of saturated magnesium sulfate is added. The resulting precipitate is collected, rolled, and pulled into fibers as in Example 2. The fibers are dried and extracted with 60 percent acetone and drawn in steam to 300 to 500 percent to give highly oriented fibers.

*Example 5.*—Three parts of pulverized dried egg white and three parts of sodium lauryl sulfate are dissolved in 100 parts water. The solution is heated to 90° centigrade for two minutes and is then cooled. Ten parts of saturated magnesium sulfate is added. The resulting precipitate is collected, rolled and pulled into fibers as in Example 2. These are partially dried, extracted with 60 percent acetone and steam drawn 300 to 500 percent to give highly oriented fibers.

*Example 6.*—To 1 part sodium alkyl aryl sulfonate (4% in aqueous solution), there is added 1 part egg alubmin (4% in aqueous solution). To this mixture ¼ part saturated aqueous solution of sodium, magnesium or ammonium sulphate is added as coagulant. The precipitate is collected in any known manner, such as filtration, centrifugation, etc., kneaded and then may be drawn into fibers or stretched into films.

*Example 7.*—To 2 parts 4% aqueous egg albumin solution, there are added 2½ parts sodium alkyl aryl sulphonate or an alkyl naphthyl sulphonate (5% aqueous solution). Precipitate with ½ part saturated magnesium sulphate solution. As soon as possible after precipitation, knead the resulting precipitate into a rod form and pull into fibers.

*Example 8.*—To 1 part dried egg white, are added 2 parts sodium alkyl aryl sulphonate and dissolved in 40 parts water; add 30 parts triethanolamine xanthate, precipitate with 1 part saturated magnesium sulphate; collect the precipitate as rapidly as possible and knead into rod form and pull into fibers.

*Example 9.*—To 1 part dried blood, add 2 parts sodium alkyl aryl sulphonate and dissolve in 40 parts water; add 30 parts triethanolamine xanthate. Precipitate with 1 part saturated magnesium sulphate. Collect the precipitate as rapidly as possible and knead into rod form and pull into fibers.

*Example 10.*—Extract commercial zein or soybean protein with 4% sodium alkyl aryl sulphonate solution by heating to 90° for at least 2 minutes. To 5 parts of extract, add ¼ part saturated magnesium sulphate. The resulting precipitate may be pulled into fibers or stretched into films.

*Example 11.*—To 2 parts of an 0.1 N acetic acid extract of wheat gluten, add 2 parts of 5% sodium alkyl aryl sulphonate and $\frac{1}{10}$ part of triethanolamine xanthate (or $\frac{1}{10}$ part monothioglycol). The resulting precipitate may be pulled into fibers. This must be carried out as soon after precipitation as possible.

*Example 12.*—To 1 part sodium alkyl aryl sulphonate in 4% aqueous solution, there is added 1 part egg albumin 4% aqueous solution. The resulting solution is concentrated by evaporation to at least ¼ the original volume and the final solution is forced through a spinnerette into a precipitating bath solution ($MgSO_4$ ½–¾ saturated containing appropriate fixing and hardening agents). The filaments are stretched before drying.

It is to be understood that fibers and films formed as described may be modified by the addition of plasticizing, hardening or fixing agents in the manner well understood in the art in order to increase the water resistance, pliability, tensile strength or to obtain other desirable properties.

Having thus described my invention, I claim:

1. The process of manufacturing thin articles, such as fibers and films, from corpuscular protein comprising treating corpuscular protein in aqueous solution with a detergent selected from the group consisting of alkyl aryl sulphonates and alkyl sulphates, whereby molecules of the detergent attach themselves to the corpuscular chains of the protein molecules and cause said chains to unfold, adding a neutral salt to the resulting solution to precipitate the protein combined with the said detergent and deforming the precipitate into thin articles, treating the deformed precipitate with a solvent selected from the group consisting of aqueous acetone and aqueous alcohol to split the detergent protein complex, and recovering the resulting protein article.

2. The process of manufacturing thin articles, such as fibers and films, from a protein, comprising treating the protein in aqueous solution with a detergent selected from the group consisting of alkyl aryl sulphonates and alkyl sulphates whereby molecules of the detergent attach themselves to the protein molecules, adding a neutral salt to the resulting solution to precipitate the protein combined with said detergent and deforming the precipitate into a thin article, treating the deformed precipitate with a solvent selected from the group consisting of aqueous acetone and aqueous alcohol to split the detergent protein complex, and recovering the resulting protein article.

3. The process of manufacturing thin articles, such as fibers and films, from chicken feather kerateine, comprising treating the chicken feather kerateine in aqueous solution with an alkyl aryl sulphonate detergent whereby molecules of the detergent attach themselves to the protein molecules, adding a neutral salt to the resulting solution to precipitate the kerateine combined with said detergent and deforming it into thin articles, treating the deformed precipitate with aqueous acetone to split the detergent kerateine complex, and recovering the resulting kerateine article.

4. The process of manufacturing thin articles, such as fibers and films, from hoof kerateine, comprising treating the hoof keratein in aqueous solution with an alkyl aryl sulphonate detergent whereby molecules of the detergent attach themselves to the protein molecules, adding a neutral salt to the resulting solution to precipitate the kerateine combined with said detergent and deforming it into thin articles, treating the deformed precipitate with aqueous acetone to split the detergent kerateine complex, and recovering the resulting kerateine article.

5. The process of manufacturing thin articles, such as fibers and films, from egg albumin, comprising treating the egg albumin in aqueous solution with a sodium isopropyl naphthalene sulphonate detergent whereby molecules of the detergent attach themselves to the protein molecules, adding a neutral salt to the resulting solution to precipitate the albumin combined with said detergent and deforming it into thin articles, treating the deformed precipitate with aqueous acetone to split the detergent albumin complex, and recovering the resulting albumin article.

HAROLD P. LUNDGREN.

REFERENCES CITED

The following references are of record in the file of this patent:

UNITED STATES PATENTS

| Number | Name | Date |
|---|---|---|
| 1,959,185 | Wappes et al. | May 15, 1934 |
| 2,030,226 | Rankin et al. | Feb. 11, 1936 |
| 2,169,690 | Gould et al. | Aug. 15, 1939 |
| 2,204,535 | Gould et al. | June 11, 1940 |
| 2,233,891 | Kratz | Mar. 4, 1941 |
| 1,536,012 | Joslin | Apr. 28, 1925 |
| 2,290,789 | Wormell | July 21, 1942 |
| 1,946,159 | Graenacher | Feb. 6, 1934 |
| 2,007,633 | Bornhauser | July 9, 1935 |

FOREIGN PATENTS

| Number | Country | Date |
|---|---|---|
| 467,704 | Great Britain | June 22, 1937 |

OTHER REFERENCES

The X-Ray Interpretation of Denaturation and the Structure of the Seed Globulins Biochem. Jour. Oct. issue 1935, pp. 2351-2360. (Copy in Div. 15.) Astbury and Dickinson.

Michaelis, A Study of Keratin, Jour. of the American Leather Chemists Association, vol. XXX, November, 1935, No. 11, pp. 557-568. (Copy in Div. 15.)

Astbury et al., Jour. Chem. Soc. 1935, June issue, pp. 846-851. (Copy in Div. 15.)

"The Denaturation of Proteins by Synthetic Detergents and Bile Salts"—J. Gen. Physial, vol. 23, pp. 239-261 (1939).